(12) United States Patent
Hvasta et al.

(10) Patent No.: US 12,467,565 B2
(45) Date of Patent: Nov. 11, 2025

(54) BRITTLE MATERIAL JOINTS WITH DYNAMIC SEALING

(71) Applicant: Fourth Power, Inc., Cambridge, MA (US)

(72) Inventors: Mike Hvasta, Lawrence Township, NJ (US); Colin Kelsall, Cambridge, MA (US); Asegun Henry, Hyde Park, MA (US); Sandeep Pidaparti, Burlington, MA (US); Joe Patrinostro, Centerville, MA (US)

(73) Assignee: Fourth Power, Inc., Cambridge, MA (US)

( * ) Notice: Subject to any disclaimer, the term of this patent is extended or adjusted under 35 U.S.C. 154(b) by 0 days.

(21) Appl. No.: 18/419,239

(22) Filed: Jan. 22, 2024

(65) Prior Publication Data

US 2024/0247741 A1    Jul. 25, 2024

Related U.S. Application Data

(60) Provisional application No. 63/440,358, filed on Jan. 20, 2023.

(51) Int. Cl.
*F16L 21/02* (2006.01)
*F16L 21/08* (2006.01)

(52) U.S. Cl.
CPC .............. *F16L 21/022* (2013.01); *F16L 21/08* (2013.01)

(58) Field of Classification Search
CPC . F16L 49/02; F16L 49/06; F16L 21/04; F16L 21/007; F16L 21/06; F16L 21/022; F16L 21/08; F16L 55/1108
See application file for complete search history.

(56) References Cited

U.S. PATENT DOCUMENTS

| | | | |
|---|---|---|---|
| 1,940,983 A | | 12/1933 | Waldron |
| 2,066,270 A | * | 12/1936 | Hubbard ................. F16L 21/04 285/342 |

(Continued)

FOREIGN PATENT DOCUMENTS

GB          189820 A      12/1922

OTHER PUBLICATIONS

International Search Report and Written Opinion issued by the International Searching Authority in International Patent Application No. PCT/US24/12463, dated May 22, 2024.

*Primary Examiner* — David Bochna
(74) *Attorney, Agent, or Firm* — Polygon IP, LLP

(57) ABSTRACT

A joint structure may include a first component and a second component aligned in a first direction, where a first end of the first component is opposed to a first end of the second component. The joint structure may include a packing shell positioned around the first end of the first component and the first end of the second component such that the first component is inserted into the packing shell from the first end and the second component is inserted into the packing shell from the first end. The joint structure may include a first sealing element positioned between the packing shell and the first end of the first component and further extending into the packing shell. The joint structure may include a second sealing element positioned between the packing shell and the first end of the second component and further extending into the packing shell.

19 Claims, 12 Drawing Sheets

(56) References Cited

U.S. PATENT DOCUMENTS

| | | | | |
|---|---|---|---|---|
| 2,832,615 | A * | 4/1958 | Summers | F16L 21/08 |
| | | | | 285/356 |
| 4,183,560 | A * | 1/1980 | Wyss | F16L 21/08 |
| | | | | 285/356 |
| 4,448,448 | A | 5/1984 | Pollia | |
| 4,779,900 | A * | 10/1988 | Shumard | F16L 21/08 |
| | | | | 285/364 |
| 5,219,189 | A * | 6/1993 | Demoisson | F16L 37/0845 |
| | | | | 285/374 |
| 9,777,873 | B1 * | 10/2017 | Crompton | F16L 21/04 |
| 2004/0232700 | A1 * | 11/2004 | Jones | F16L 21/08 |
| | | | | 285/421 |
| 2004/0239114 | A1 * | 12/2004 | Barron | F16L 21/08 |
| | | | | 285/348 |
| 2005/0212297 | A1 * | 9/2005 | McPherson | F16L 13/116 |
| | | | | 285/915 |
| 2005/0218652 | A1 * | 10/2005 | Sakamoto | F16L 21/04 |
| | | | | 285/343 |
| 2013/0076027 | A1 | 3/2013 | Maenishi et al. | |
| 2016/0153592 | A1 * | 6/2016 | Showkathali | F16L 21/04 |
| | | | | 285/369 |
| 2017/0051854 | A1 | 2/2017 | Bird | |
| 2018/0045197 | A1 | 2/2018 | Henry et al. | |
| 2018/0163905 | A1 | 6/2018 | Ohnemus et al. | |
| 2018/0224030 | A1 | 8/2018 | Clapper et al. | |
| 2019/0264843 | A1 | 8/2019 | Furcoiu | |
| 2019/0316725 | A1 * | 10/2019 | McGarian | F16L 21/04 |
| 2020/0332933 | A1 * | 10/2020 | Furcoiu | F16L 21/08 |

\* cited by examiner

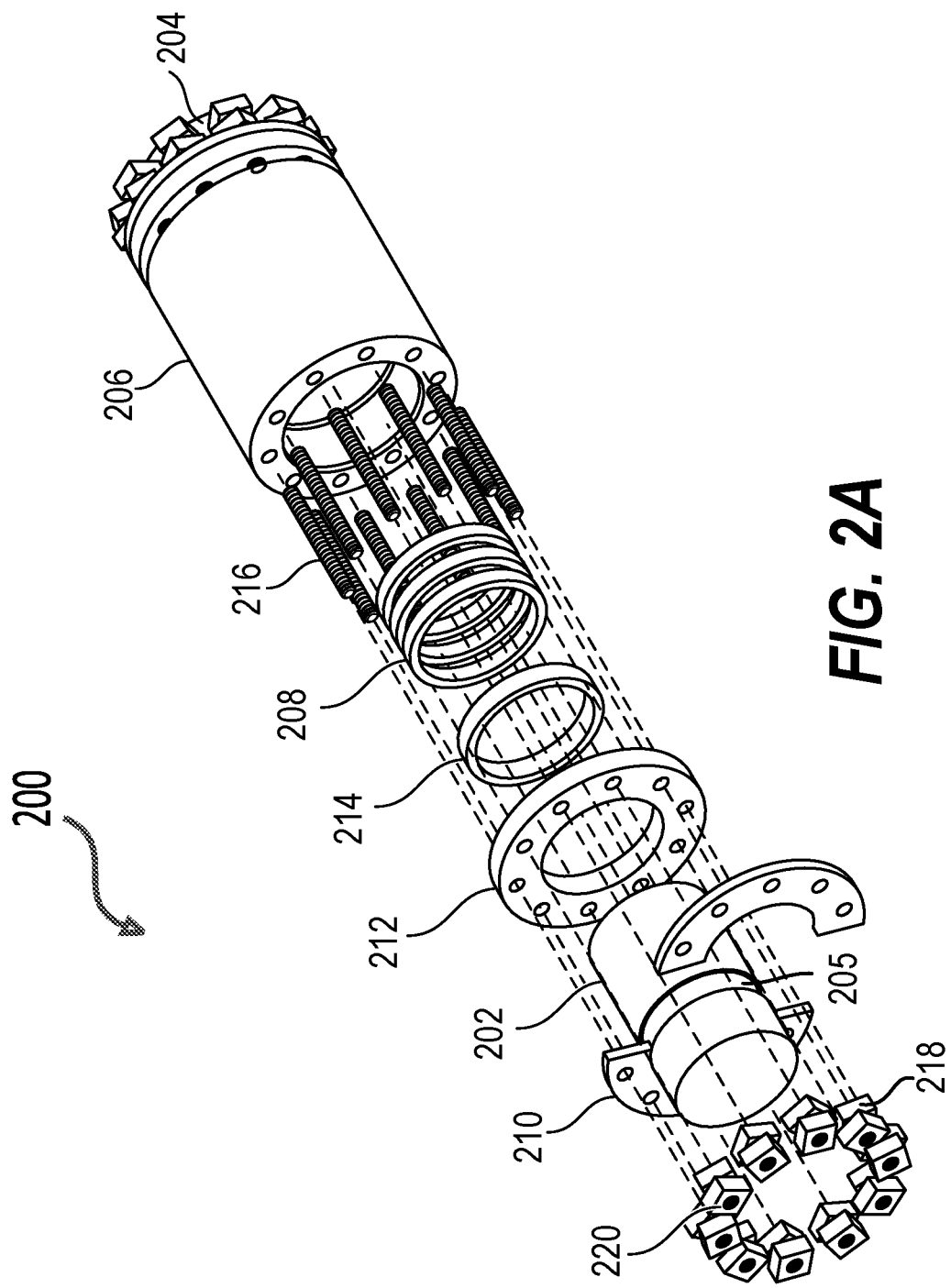

BRITTLE MATERIAL JOINTS WITH DYNAMIC SEALING

CROSS REFERENCE TO RELATED APPLICATIONS

The present application claims the benefit of priority to U.S. Provisional Application No. 63/440,358 entitled "Dynamically Sealed Expansion Joints for Brittle Materials" filed on Jan. 20, 2023, which is incorporated by reference herein in its entirety.

TECHNICAL FIELD

Aspects of the present disclosure relate to fluid handling systems. For example, the fluid handling systems may include thermofluid circulation systems for energy storage systems, such as thermal energy storage systems termed thermal batteries. Aspects of the present disclosure may be used to seal against corrosive, or high temperature fluids, and may be used to manage and reduce stresses induced by thermal expansion and contraction of a joint structure applied in the energy storage system.

BACKGROUND

Most flowing fluid or solid material handling systems are constructed from standard engineering construction materials, such as concrete or cement, polymers such as polyvinyl chloride (PVC), or ductile metals such as aluminum alloys, magnesium alloys, iron alloys, titanium alloys and nickel alloys. However, these materials have important limitations, namely they are limited to extended use at temperatures below ~1000° C. There are nonetheless other applications where it is desirable to operate material handling systems above 1000° C., or in corrosive environments where the aforementioned materials or their derivatives or composites are unsuitable. One such case is an energy storage system, herein termed thermal batteries, that requires a sealed fluid handling infrastructure for liquid tin, which has a nominal operating temperature range of 1900° C.-2400° C. For this application, it may be convenient to use a piping system made of high-temperature materials, such as carbon (or graphite) or ceramics. For normal thermofluid handling infrastructures, the ductile nature of the piping network may be relied upon to absorb the growth/shrinkage during thermal cycles. For example, expansion joints, which may be U-shaped sections of the piping network, may be intentionally added so that when long sections of the piping system (or piping network) expand/contract, the expansion joints may simply mechanically deflect, bend, or stretch, in a reversible way that does not lead to fracture. The deflection may be designed to stay well within a safe operating regime of the material so that mechanical failure may be prevented. However, for brittle materials (e.g., graphite), such an approach may lead to pipe fracture or component rupture, or mechanical failure, since the brittle materials do not bend, stretch, or yield much before fracture.

SUMMARY

Aspects of the disclosure include methods and apparatuses related to static or dynamically sealed joints made for brittle piping, routing, transport or plumbing materials.

According to an aspect of the disclosure, one example joint structure is provided, which can be adapted to many applications involving unions or joints between pipe, conduits, subsystems, plumbing components such as pumps, valves, flow meters etc. The joint structure may include a first component and a second component that may be aligned in a first direction, where a first end of the first component may be opposed to a first end of the second component. The joint structure may include a packing shell positioned around the first end of the first component and the first end of the second component such that the first component may be inserted into the packing shell from the first end and the second component may be inserted into the packing shell from the first end. The joint structure may include a first sealing element positioned between the packing shell and the first end of the first component and further extending into the packing shell. The joint structure may include a second sealing element positioned between the packing shell and the first end of the second component and further extending into the packing shell. The sealing element could be a packing material, an O-ring, a gasket, a ferrule, or other sealing component made from graphite, another allotrope of carbon, a metal such as tungsten, or ceramic. An arrangement of components could be assembled to form a simple flange interface, that can serve as a static joint that does not allow for translation, or as is detailed further in the following, a more elaborate joint that allows for dynamic translation or rotation, while still maintaining a seal against the material being contained.

In an aspect, the first component can include a first pipe, a first value, a first pump, and a first flow meter. The second component can include a second pipe, a second value, a second pump, and a second flow meter.

In the joint structure, a first gap may be positioned between an outer surface of the first end of the first component and an inner surface of the packing shell, where the first gap may be in a range between 100 um and 2000 um. Further, a second gap may be positioned between an outer surface of the first end of the second component and the inner surface of the packing shell, where the second gap may be in the range between 100 um and 2000 um.

In an example, the packing shell may include a first recess region in which the first sealing element extends and a second recess region in which the second sealing element extends. The first recess region may surround the first end of the first component and the second recess region may surround the first end of the second component.

The joint structure may include a first compression ring positioned around the first end of the first component. A first end of the first compression ring may be: (i) adjacent to the first sealing element; and (ii) positioned between the first end of the first component and the packing shell. The joint structure may include a second compression ring positioned around the first end of the second component. A first end of the second compression ring may be: (i) adjacent to the second sealing element; and (ii) positioned between the first end of the second component and the packing shell.

The joint structure may include a first compression flange positioned adjacent to a second end of the first compression ring and around the first end of the first component, and a second compression flange positioned adjacent to a second end of the second compression ring and around the first end of the second component.

The joint structure may include a first split flange positioned adjacent to the first compression flange and around the first end of the first component, where the first split flange includes a first portion and a second portion and may further be arranged in a first recessed region of the first component. The joint structure may include a second split flange positioned adjacent to the second compression flange and around the first end of the second component, where the second split flange includes a third portion and a fourth portion and may further be arranged in a second recessed region of the second component.

The joint structure may include: (i) a first nut disposed adjacent to the first split flange; (ii) a first bolt extending through the first nut, the first split flange, the first compression flange, and further into the packing shell; (iii) a second nut disposed adjacent to the second split flange; and (iv) a second bolt extending through the second nut, the second split flange, the second compression flange, and further into the packing shell.

In an example, the first end of the first component may have a chamfered edge between a front surface perpendicular to the first direction and an external surface along the first direction. The chamfered edge of the first end of the first component may have an angle between 30 degrees and 60 degrees with respect to the first direction. The packing shell may have a chamfered edge θ3 that may be arranged between a front surface perpendicular to the first direction and an external surface along the first direction. The chamfered edge of the packing shell may be opposed to a first compression flange and have an angle between 30 degrees and 60 degrees with respect to the first direction.

The joint structure may include a gasket positioned between the first end of the first component and the first end of the second component and configured to seal a gap between the first end of the first component and the first end of the second component.

The joint structure may include a first chemical bonding layer filled in the first gap and the second gap, and a second chemical bonding layer positioned between a first bolt and the packing shell, the first bolt being extended into the packing shell. In one embodiment, the chemical bonding layer could be a reaction bonding agent (e.g., derived from tar or pitch) that forms a carbon allotrope or graphite after a curing process.

The joint structure may include a first clamping plate that may be positioned between the first split flange and the first nut and configured to exert compression to the first sealing element.

In an example, the first sealing element may be made of a deformable material and may include one of: (i) a plurality of packing ropes; and (ii) a ferrule.

In an example, the first bolt, the first compression flange, and the first split flange may have a similar thermal expansion coefficient, or could be designed such that the choice of materials and dimensions lead to a similar overall thermal expansion that tightens the seal, keeps the sealing pressure close to constant, or decreases it.

In an example, the first component, the second component, and the packing shell may have a similar thermal expansion coefficient or could be designed such that the choice of materials and dimensions lead to a similar overall thermal expansion that tightens the seal, keeps the sealing pressure close to constant, or decreases it.

In an example, the first component, the second component, and the packing shell may be made of a first graphite material. The first compression ring, the first compression flange, and the first split flange may be made of a second graphite material that may have a strength higher than a strength of the first graphite material, such as a carbon fiber reinforced composite. The first nut and the first bolt may be made of a third graphite material that may have a strength higher than the strength of the second graphite material.

The joint structure may further include a liquid flowing in the first component and the second component, whereby the liquid is alloyed with elements intended to react with the containment materials to form a coating or sealing layer, in situ, such as silicon, zirconium or titanium, which would form silicon carbide, zirconium carbide, or titanium carbide respectively with a carbon based containment system.

Another aspect of the disclosure relates to a method of forming a joint structure. In the method, a first sealing element may be arranged around a first end of a first component and a second sealing element may be arranged around a first end of a second component. The first sealing element and the first end of the first component may be inserted into a packing shell from a first open end of the packing shell. The second sealing element and the first end of the second component may be inserted into the packing shell from a second open end of the packing shell. The packing shell may be positioned around the first end of the first component and the first end of the second component. The first end of the first component may be opposed to the first end of the second component. The first component and the second component may be aligned in a first direction. The first sealing element may be positioned between the packing shell and the first end of the first component and further extends into the packing shell. The second sealing element may be positioned between the packing shell and the first end of the second component and further extends into the packing shell.

In the method, a first compression ring may be arranged around the first end of the first component. A first end of the first compression ring may be: (i) adjacent to the first sealing element; and (ii) positioned between the first end of the first component and the packing shell. A second compression ring may be arranged around the first end of the second component, where a first end of the second compression ring may be: (i) adjacent to the second sealing element; and (ii) positioned between the first end of the second component and the packing shell.

In the method, a first compression flange may be arranged adjacent to a second end of the first compression ring and around the first end of the first component. A second compression flange may be disposed adjacent to a second end of the second compression ring and around the first end of the second component.

In the method, a first split flange may be arranged adjacent to the first compression flange and around the first end of the first component. The first split flange may include a first portion and a second portion and may further be arranged in a first recessed region of the first component. A second split flange may be arranged adjacent to the second compression flange and around the first end of the second component, where the second split flange may include a third portion and a fourth portion and may further be arranged in a second recessed region of the second component.

BRIEF DESCRIPTION OF THE DRAWINGS

Further features, the nature, and various advantages of the disclosed subject matter will be more apparent from the following detailed description and the accompanying drawings in which:

FIG. 2A shows a perspective view of an example joint structure in accordance with some aspects.

DETAILED DESCRIPTION

Thermal batteries may be grid scale rechargeable batteries that are intended to store electricity from renewables and enable greater penetration of renewable energy onto the grid. Thermal batteries may operate by taking electricity from the grid, from any source, converting the electricity to extremely high-temperature sensible heat (e.g., 1900-2400° C.), and then storing the thermal energy in thermally well-insulated facilities until the energy is dispatched, either as electricity or heat. When needed, the stored thermal energy may be converted back to electricity via thermophotovoltaics (TPV). Thermal batteries may be thermally-insulated and held inside an inert environment, such as an argon (Ar)-filled environment. The inert environment may prevent oxidation of high-temperature materials used in the thermal batteries and allow the energy storage system to have an expected lifetime of 30 years or more. Furthermore, it can be used as fire suppression, or for fire/tamper prevention. Aspects of the thermal batteries disclosed herein include that the power and energy may be decoupled, such that the thermal batteries may be sized to have a 1 hr, a 10 hr, or a greater than 100 hr discharge (or any duration in between approximately 1-1000 hrs). In an aspect, the energy storage system of the thermal batteries may be built based on carbon and tin (Sn). Sn may be used as a heat transfer fluid because Sn does not chemically interact with the carbon at any temperature. Thus, corrosion may be prevented and the materials (e.g., Sn and carbon) of the energy storage system may remain in thermodynamic equilibrium with each other. Sn may be used because Sn has a low melting point (e.g., 232° C.), a high boiling point (e.g., 2602° C.), and weak oxidation. Thus, Sn may not pose a fire or explosion hazard like alkali metals that have been extensively researched for nuclear applications. Furthermore, Sn is affordable, as Sn is much less expensive than similar metals like gallium and is available in large quantities as Sn is the primary component of solders.

Figure 1:
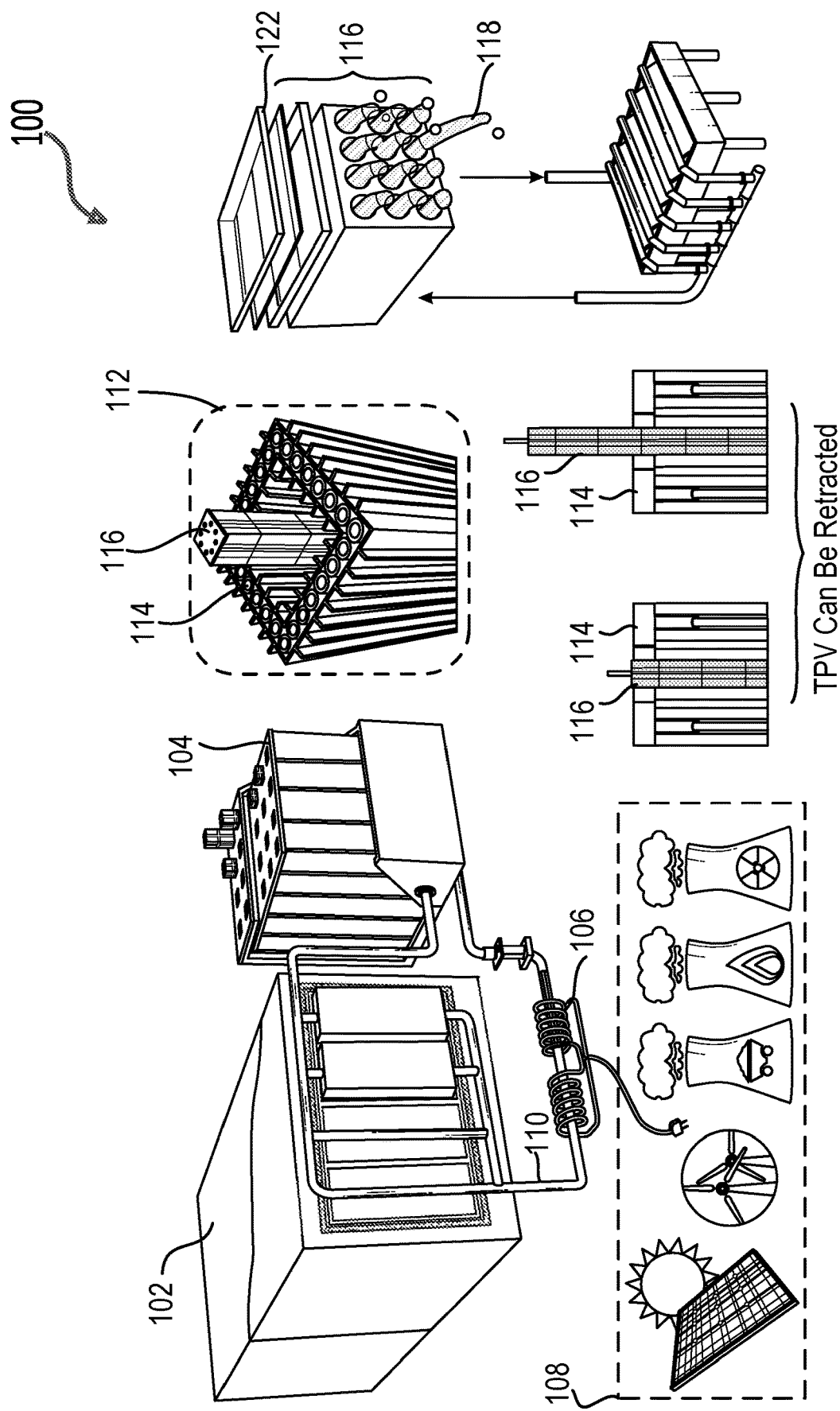
FIG. 1 shows an example diagram of a thermal battery system in accordance with some aspects.

FIG. 1 shows an example thermal battery system (interchangeably referred to herein as a thermal battery) 100. As shown in FIG. 1, the system 100 may include a storage unit 102 that may include a plurality of graphite blocks. The storage unit 102 may have a large size, such as 30 m×15 m×10 m. Each of the plurality of graphite blocks may have a nominal dimension, such as 0.6 m×0.6 m×2 m. The storage unit 102 may be configured to store thermal energy. The system 100 may include a power block 104. The power block 104 may include an array of thermophotovoltaics (TPV) unit cell structures (interchangeably referred to herein as TPV cells) 112. Each TPV cell 112 may work in a same way as normal solar photovoltaics (PV), via the photoelectric effect, to convert light (interchangeably referred to herein as photons) into electricity. Each of the TPV cells 112 may include an array of pipes 114 and a TPV device 116. As shown in FIG. 1, the TPV device 116 may further include a mirror 122 configured to reflect the light radiated from the pipes 114. The TPV device 116 may be cooled down by a liquid coolant 118, such as water. In an aspect, the TPV device 116 may be retracted (or removed) from the array of the pipes 114. The system 100 may further include a piping infrastructure 110 in which a liquid metal (e.g., Sn) may flow between the storage unit 102 and the power block 104 for heat transfer. The system 100 may include heating elements 106 that may be configured to heat up the liquid metal in the piping infrastructure 110.

An example operation of the system (or thermal battery) 100 may include charging, energy storage, and discharging. In the charging step, the system 100 may be charged with electricity from any source, such as the electrical source 108. In an aspect, the system 100 may be expected to operate using intermittent renewable energy, such as solar energy and wind energy that are shown in the electrical source 108. The heating elements 106 within the system 100 may radiatively transfer energy to the graphite piping infrastructure 110. The piping infrastructure 110 may contain liquid Sn, which may be mechanically pumped through pipes of the piping infrastructure 110 when the Sn may be heated nominally from 1900° C. to a peak temperature of ~2400° C. Once heated, the Sn may be pumped through the graphite blocks of the storage unit 102. The Sn flowing through the graphite pipes of the piping infrastructure 110 may radiatively transfer thermal energy to the graphite blocks of the storage unit 102. Once the Sn passes through the storage unit 102, Sn may be rerouted back to the heating elements 106 to be reheated to approximately 2400° C., thereby enabling continuous charging of the thermal battery system 100. When the large bank of graphite blocks in the storage unit 102 may be fully heated, the thermal battery system 100 may be considered as fully charged.

In the energy storage step, given the large size of the storage unit 102 and the fact that the storage unit 102 may be thermally insulated from an outer inert containment and environment, the heat (interchangeably referred to herein as thermal energy) in the graphite blocks of the storage unit 102 may be kept (or stored) for a period of 1 month or more, losing less than 1-5% of the energy stored each day, for example.

In the discharging step, when electricity is needed, the thermal battery system 100 may discharge by pumping the liquid metal (e.g., Sn) through the storage unit 102 towards the power block 104, which contains the array of TPV unit cell structures (or TPV cells) 112. The liquid metal (e.g., Sn) may be pumped through a parallel array of pipes 114 that then radiate light to the TPV devices 116. In an aspect, the radiated light may be a terrestrial heat source that may have a spectral peak in an infrared regime. The TPV cells 112 may convert the light emitted by the piping network (interchangeably referred to herein as an array of pipes) 114, which may be glowing white hot, back to electricity. The TPV cells 112 may be efficient since the TPV cells 112 may be designed to convert high frequency light, which may be converted most efficiently. The rest of the light may pass through the TPV cells 112 because the rest of the light may be transparent to the TPV cells 112. The rest of the light may be reflected from a minor, such as a gold or silver minor 122 at the back of the TPV device 116, for example. When reflected off the mirror 122, the light may be reabsorbed by the hot infrastructure (e.g., the pipes 114) and preserved, enabling a high roundtrip efficiency (RTE) of ~50%, for example. As the liquid metal (e.g., Sn) passes through the power block 104, some of the thermal energy of the liquid metal may be converted to electricity. Accordingly, the Sn may cool back to nominally 1900° C., for example. The Sn may recirculate through the storage unit 102 to be reheated to 2400° C. In this way, the thermal battery system 100 may be continuously discharged to meet a grid demand.

A nominal operating point for the thermal battery system 100 to store heat in the graphite blocks of the power block 104 may be between 1900° C. and 2400° C., for example. Since a size of the thermal battery system 100 generally needs to be large in order to suppress heat losses compared to the amount of energy stored, there may be inevitable growth and shrinkage within the thermal battery system 100. Some of the growth and shrinkage may be mitigated by leaving gaps between the energy storage blocks of the storage unit 102. Inevitably, however, some amount of growth/shrinkage may happen within the system 100. For a system using a heat transfer fluid, the conduits (e.g., the pipes of the piping infrastructure 110) used to carry the fluid (e.g., the liquid metal) may also grow and shrink to some extent.

Aspects of the present disclosure relate to an innovative solution to address the potential for mechanical failure of the brittle materials. In an aspect, a dynamic seal may be applied. In the dynamic seal, a joint between two rigid pipe sections may be formed that may have an ability to either translate or rotate. The joint may accommodate growth/contraction of the piping network while maintaining a tight seal against the material being contained (e.g., Sn). In an aspect of the thermal battery system 100, almost the entire system may be made from carbon. Thus, the dynamic seal may be applied in the piping infrastructure 110 and prevent the mechanical failure of the pipes in the piping infrastructure 110 due to the growth/contraction of the piping network (e.g., resulting from thermal expansion or contraction during heat up, charge/discharge cycles or cool down).

Aspects of the present disclosure relate to a means of joining two pipes that may be separate pipes such that liquid metal does not leak out between the two pipes. In one example, the joint may allow the pipes to move dynamically (e.g., sliding or rotating) while the seal may actually keep the liquid metal inside without leaking.

FIG. 2A shows a perspective view of a joint structure (interchangeably referred to herein as a joint) 200. As shown in FIG. 2A, the joint 200 may include components as follows: (1) a first component 202, such as a first pipe 202; (2) a second component 204, such as a second pipe 204; (3) an overlapping pipe section (also referred to as packing shell) 206 that serves a similar function as a gland plate to compress seal material (or sealing element) 208; (4) a split flange 210; and (5) the seal material 208. In an aspect, the joint 200 may further include a compression flange 212, a compression ring 214, a plurality of bolts 216, a first set of nuts 218, and a second set of nuts 220. In an aspect, the concept behind this type of dynamically sealing joint 200 may be that the overlapping pipe section (interchangeably referred to herein as a packing shell) 204 may allow both the first pipe 202 and the second pipe 204 to translate.

In an aspect, the first component 202 can include one of a first pipe, a first value, a first pump, a first flow meter or any suitable structure in the thermal battery system 100. The second component 204 can include one of a second pipe, a second value, a second pump, a second flow meter, or any suitable structure in the thermal battery system 100.

Figure 2B:
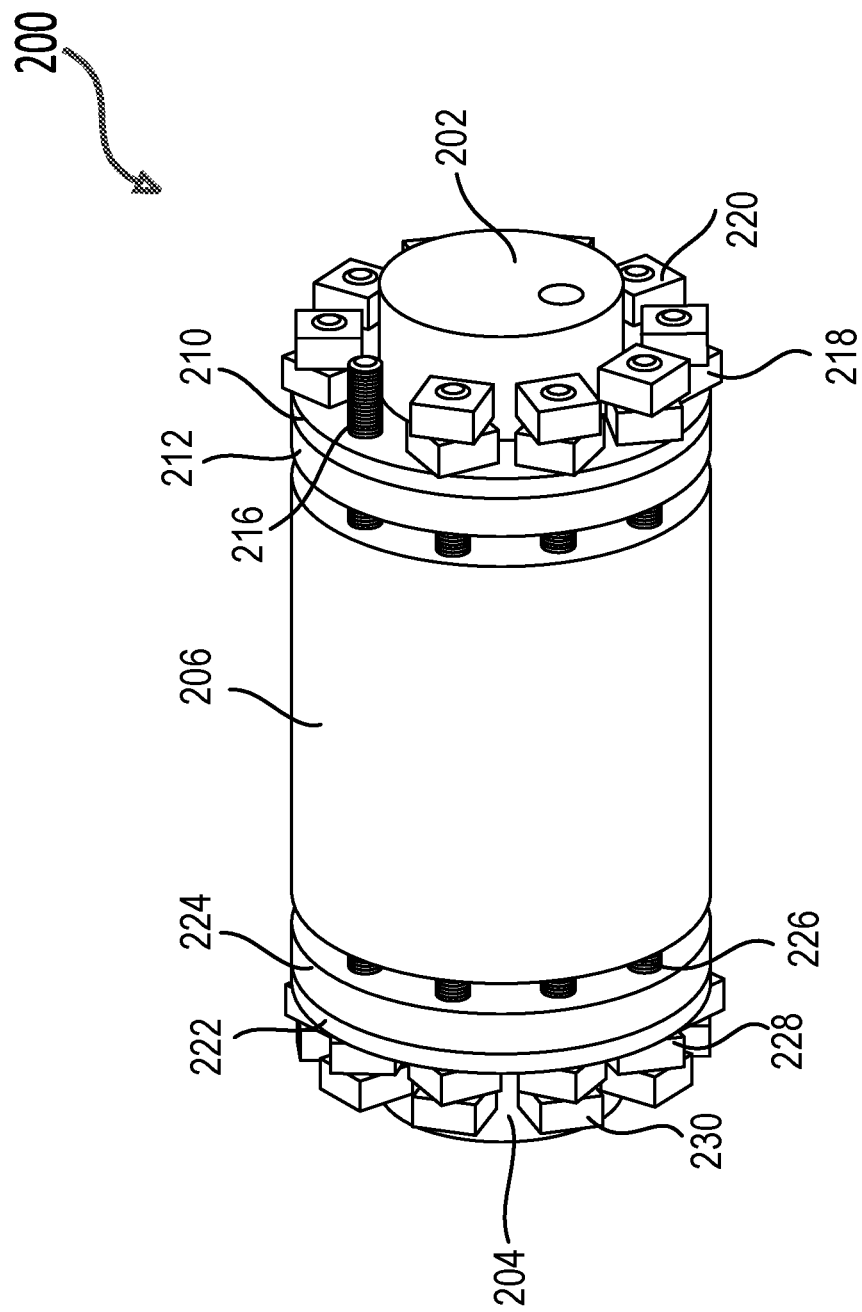
FIG. 2B shows a front view of the example joint structure in accordance with some aspects.

FIG. 2B shows a front view of the joint 200, in accordance with aspects of the disclosure. As shown in FIG. 2B, on the side of the second pipe 204, the joint 200 may further include a split flange 222, a compression flange 224, a plurality of bolts 226, a first set of nuts 228, and a second set of nuts 230, for example. The split flanges 210 and 222 on the two sides of the joint 200 may have bolts (e.g., 216 and 226) extending through. When the nuts (e.g., 218, 220, 228, and 230) are tightened or when an external compression assembly is used, the split flanges 210 and 222 may be pulled or pushed towards each other. When the split flanges 210 and 222 are pulled or pushed towards each other, the split flanges 210 and 222 may slide along the first pipe 202 and the second pipe 204, and butt up against the seal material (e.g., 208) to compress the seal material. Instead of making the seal material run across the entire joint from one flange (e.g., 210) to the other flange (e.g., 222), the overlapping pipe section (interchangeably referred to herein as a packing shell) 206 may occupy an intermediate space between the seal material (e.g., 208) as a rigid body, while the seal material may be deformable, such as compressible. When the seal material may be compressed by the flanges (e.g., 210, 212, 222, and 224) and overlapping pipe section (or packing shell) 206, the seal material (e.g., 208) may be pressed internally. Due to a Poisson's ratio of the seal material, the seal material may expand in a radial direction along the packing shell 206. The radial expansion may then cause the seal material to fill microscopic gaps that might exist to form a seal that prevents leakage of the fluid (e.g., Sn) contained inside the pipes (e.g., 202 and 204).

In an aspect, the seal material (e.g., 208) may seal the joint 200 dynamically. For example, once the flanges (e.g., 212 and 224) compress the seal material, the first pipe 202 and the second pipe 204 may still be able to translate, because the seal material may be soft, easily eroded, or otherwise able to move whilst maintaining a seal. Thus, the pipes may translate within the joint 200, while the seal material may remain compressed. The dynamic sealing of the seal material may allow for expansion/contraction of the first pipe 202 and/or the second pipe 204 without mechanical failure or creating a leak path. The dynamic sealing of the seal material may be extended and used in a wide variety of ways to solve a core problem that may exist in a system such as a thermal battery where either cyclic or static growth/contraction occurs. Furthermore, the use of a flange (e.g., 210 and 222) that may be split into two halves may allow for easier assembly, as an installer may bring together two halves around a pipe (e.g., 202) to form the joint, rather than having to slide the flange over an open end of the pipe. Furthermore, a temporary external compression assembly may be used that is made from other materials such as metals that are ductile or have other properties of interest at the temperatures or conditions associated with the joint assembly. This external compression assembly may be greatly oversized, and may include threaded bolts or automated hydraulic or electromechanical components to compress the sealing material. This then allows the more permanent construction materials to be assembled with much lower applied stresses, and for example could be used with, or in combination with reaction bonding approaches that could cure in place and hold the stress required to maintain the seal.

In accordance with some aspects, as shown in the example of FIG. 2A, each of the packing shell 206, the compression ring 214, the compression flange 212, the split flange 210, and the pipe 202 may have a circular cross-section. However, FIG. 2A is merely an example, and cross-sections of the packing shell 206, the compression ring 214, the compression flange 212, the split flange 210, and the pipe 202 may have any shapes, such as a square shape, a triangle shape, a rectangular shape, or the like, which may facilitate interfaces with other structural supports. For example, if a piping system were to be laid on a flat surface, having flattened faces on the split flange or other parts of the joint assembly could spread the weight or structural loading onto the flat supporting surface to minimize stress concentrations.

Figure 3A:
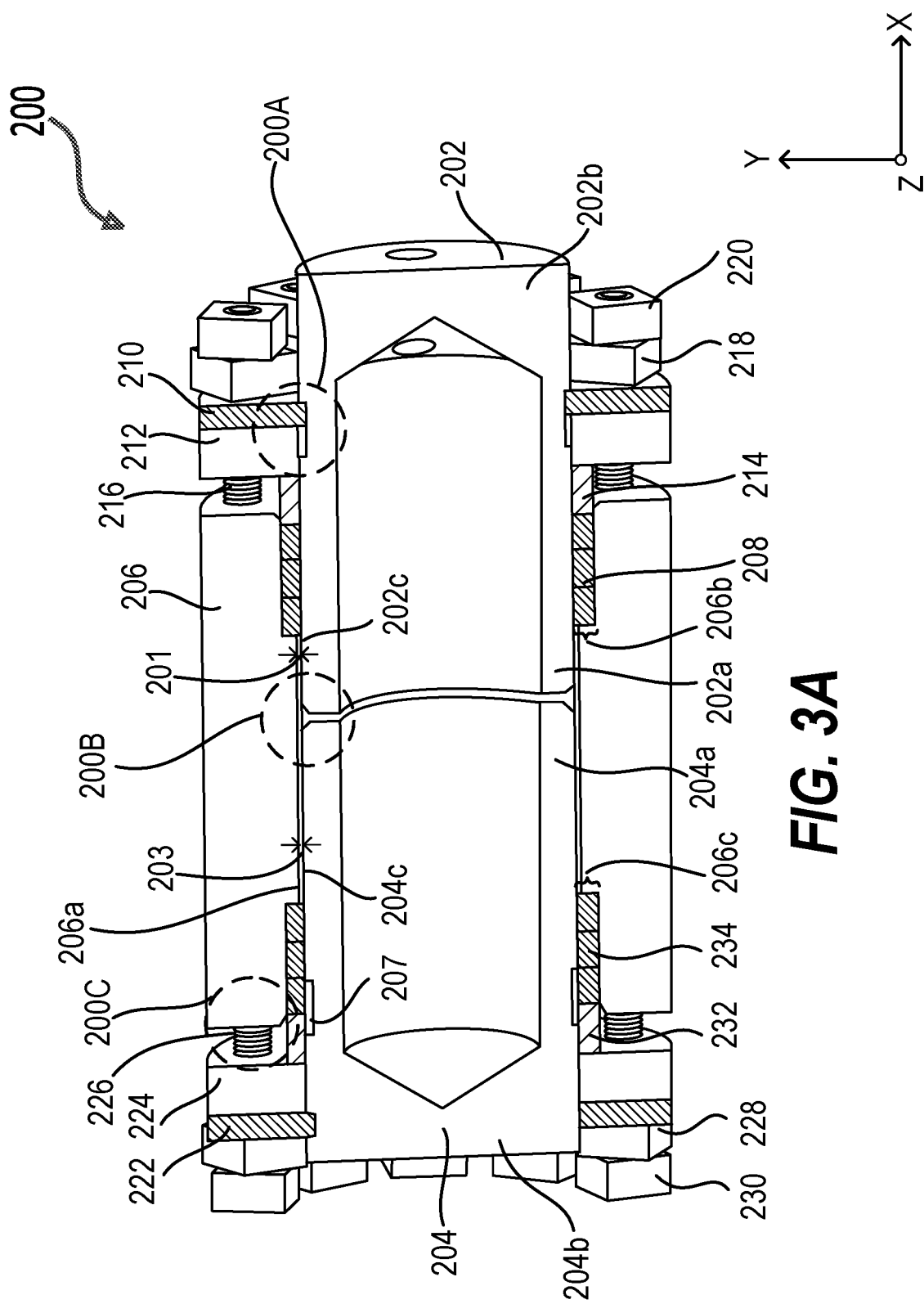
FIG. 3A shows a first cross-sectional view of the example joint structure in accordance with some aspects.

FIG. 3A is a cross-sectional view of the joint 200, in according with aspects of the disclosure. As shown in FIG. 3A, the first pipe 202 and the second pipe 204 may be aligned in a first direction (e.g., X direction). A first end 202a of the first pipe 202 may be opposed to a first end 204a of the second pipe 204. A packing shell 206 may be positioned around the first end 202a of the first pipe 202 and the first end 204a of the second pipe 204 such that the first pipe 202 may be inserted into the packing shell 206 from the first end 202a and the second pipe 204 may be inserted into the packing shell 206 from the first end 204a. A first sealing element (interchangeably referred to herein as a seal material) 208 may be positioned between the packing shell 206 and the first end 202a of the first pipe 202 and may further extend into the packing shell 206. A second sealing element (or seal material) 234 may be positioned between the packing shell 206 and the first end 204a of the second pipe 204 and further extend into the packing shell 206.

In some aspects, the first pipe 202 may have a second end 202b opposite to the first end 202a. The second pipe 204 may have a second end 204b opposite to the first end 204a. In an example, the second end 202b of the first pipe 202 may be a closed end. In an example, the second end 202b of the first pipe 202 may be an open end and connected to another component of a terminal battery system (e.g., system 100), such as another pipe through another joint. In an example, the second end 204b of the second pipe 204 may be an open end and connected to another component of the thermal battery system.

In some aspects, the first pipe 202, the second pipe 204, and the packing shell 206 may be made of graphite, graphite fiber composite, carbon fiber composite, metal, alloy, ceramic, ceramic metal composite or other suitable materials. In the example of FIG. 3A, the first pipe 202, the second pipe 204, and the packing shell 206 may be made of material such as graphite.

In an aspect, each of the first sealing element (or seal material) 208 and the second sealing element (or seal material) 234 may include one or more packing rings or packing ropes, for example. Each of the packing rings or packing ropes may be made of a flexible and deformable material, such as graphite, graphite flake, flexible graphite, or other suitable flexible/deformable packing materials, such as a polymer. In an aspect, each of the packing rings or packing ropes may be made of non-deformable/non-flexible materials, such as metal, alloy, ceramic, silica, composite or the like. In an aspect, each of the packing rings or packing ropes may be made of fibrous materials or non-fibrous materials, for example.

In an aspect, each of the first sealing element (interchangeably referred to herein as a seal material) 208 and the second sealing element (or seal material) 234 may be a respective ferrule, for example. Thus, the first sealing element (or seal material) 208 and the second sealing element (or seal material) 234 may comprise a single piece.

Still referring to FIG. 3A, a first gap 201 may be positioned between an outer surface 202c of the first end 202a of the first pipe 202 and an inner surface 206a of the packing shell 206, and the first gap 201 may be in a range between 100 um and 2000 um. A second gap 203 may be positioned between an outer surface 204c of the first end 204a of the second pipe 204 and the inner surface 206a of the packing shell 206, and the second gap may be in the range between 100 um and 2000 um. The first gap 201 may allow the first end 202a of the first pipe 202 translate or rotate in the packing shell 206. The second gap 203 may allow the first end 204a of the second pipe 204 translate or rotate in the packing shell 206.

Figure 4:
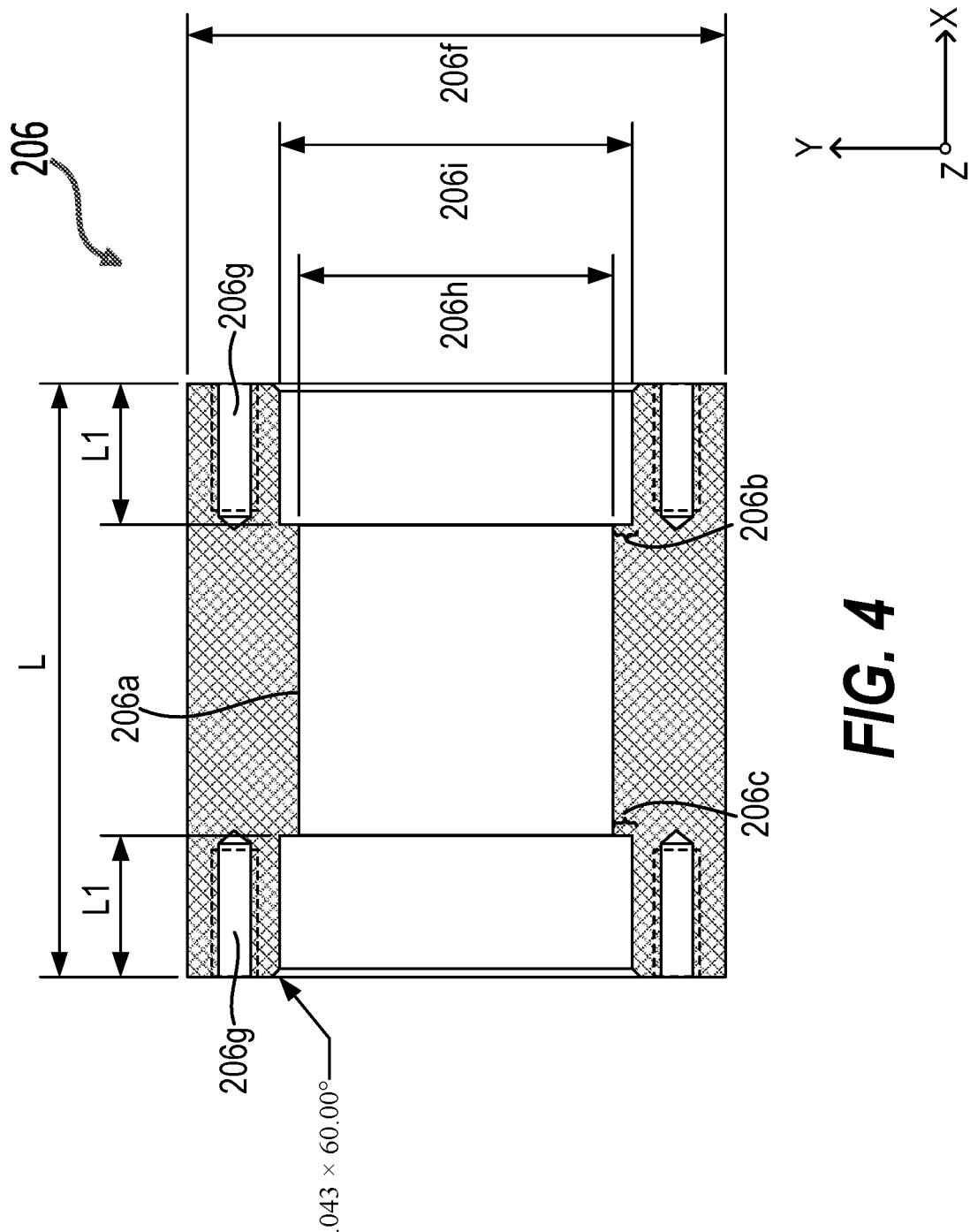
FIG. 4 shows a cross-sectional view of an example packing shell in accordance with some aspects.

As shown in FIG. 3A, the packing shell 206 may include a first recess region 206b into which the first sealing element 208 may extend. The packing shell 206 may include a second recess region 206c into which the second sealing element 234 may extend. The first recess region 206b and the second recess region 206c may define a first inner diameter 206h of the packing shell 206, which is illustrated in FIG. 4.

The first compression ring 214 may be positioned around the first end 202a of the first pipe 202. A first end of the first compression ring 214 may be: (i) adjacent to the first sealing element 208; and (ii) positioned between the first end 202a of the first pipe 202 and the packing shell 206, and the second compression ring 232 may be positioned around the first end 204a of the second pipe 204. A first end of the second compression ring 232 may be: (i) adjacent to the second sealing element 234; and (ii) positioned between the first end 204a of the second pipe 204 and the packing shell 206. The first compression ring 214 and the second compression ring 232 may be made of graphite, graphite fiber composite, metal, alloy, ceramic, or other suitable material, for example.

The first compression flange 212 may be positioned adjacent to a second end of the first compression ring 214 and around the first end 202a of the first pipe 202, and the second compression flange 224 may be positioned adjacent to a second end of the second compression ring 232 and around the first end 204a of the second pipe 204.

Figure 6:
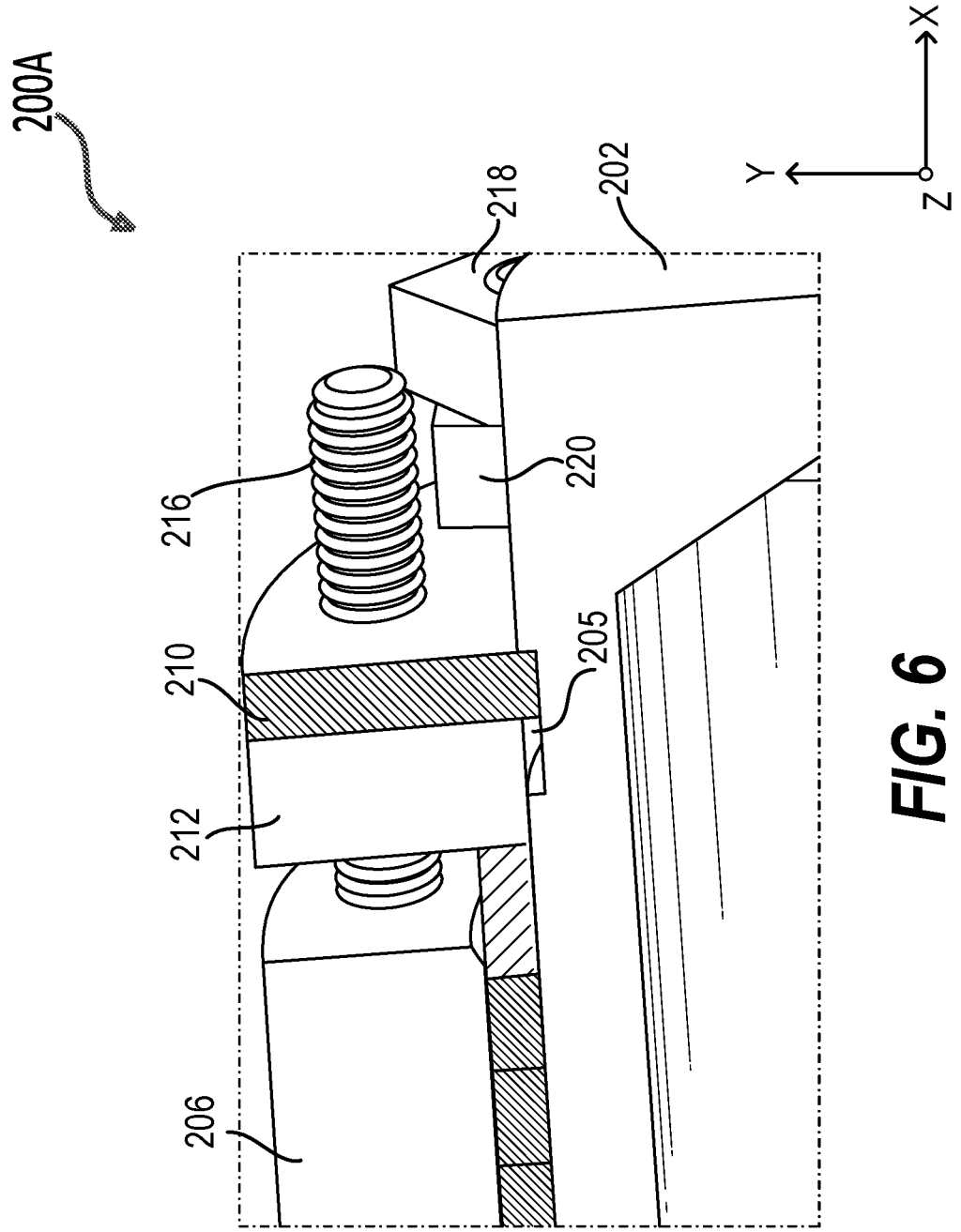
FIG. 6 shows an enlarged view of an example groove in accordance with some aspects.

The first split flange 210 may be positioned adjacent to the first compression flange 212 and around the first end 202a of the first pipe 202. The first split flange 210 may include a first portion and a second portion and further be arranged in a first recessed region (interchangeably referred to herein as a first groove) 205 of the first pipe 202. An expanded view of the first recessed region 205 of the first pipe 202 is shown in FIG. 6, for example. The second split flange 222 may be positioned adjacent to the second compression flange 224 and around the first end 204a of the second pipe 204. The second split flange 222 may include a third portion and a fourth portion and further be arranged in a second recessed region (interchangeably referred to herein as a second groove) 207 of the second pipe 204.

In an aspect, a length of the first recessed region 205 may have a range between 5 mm to 10 mm. The length of the first recessed region 205 may indicate a range in which the first end 202a of the first pipe 202 may translate in the first direction (e.g., X direction). The first recessed region (interchangeably referred to herein as a first groove) and the second recessed region (interchangeably referred to herein as a second groove) may be large enough to accommodate thermal expansion/contraction of the pipes (e.g., 202 and 204) as well as any movement of the flanges (e.g., 210 and 222) relative to the packing shell 206 during compression, for example.

Figure 7:
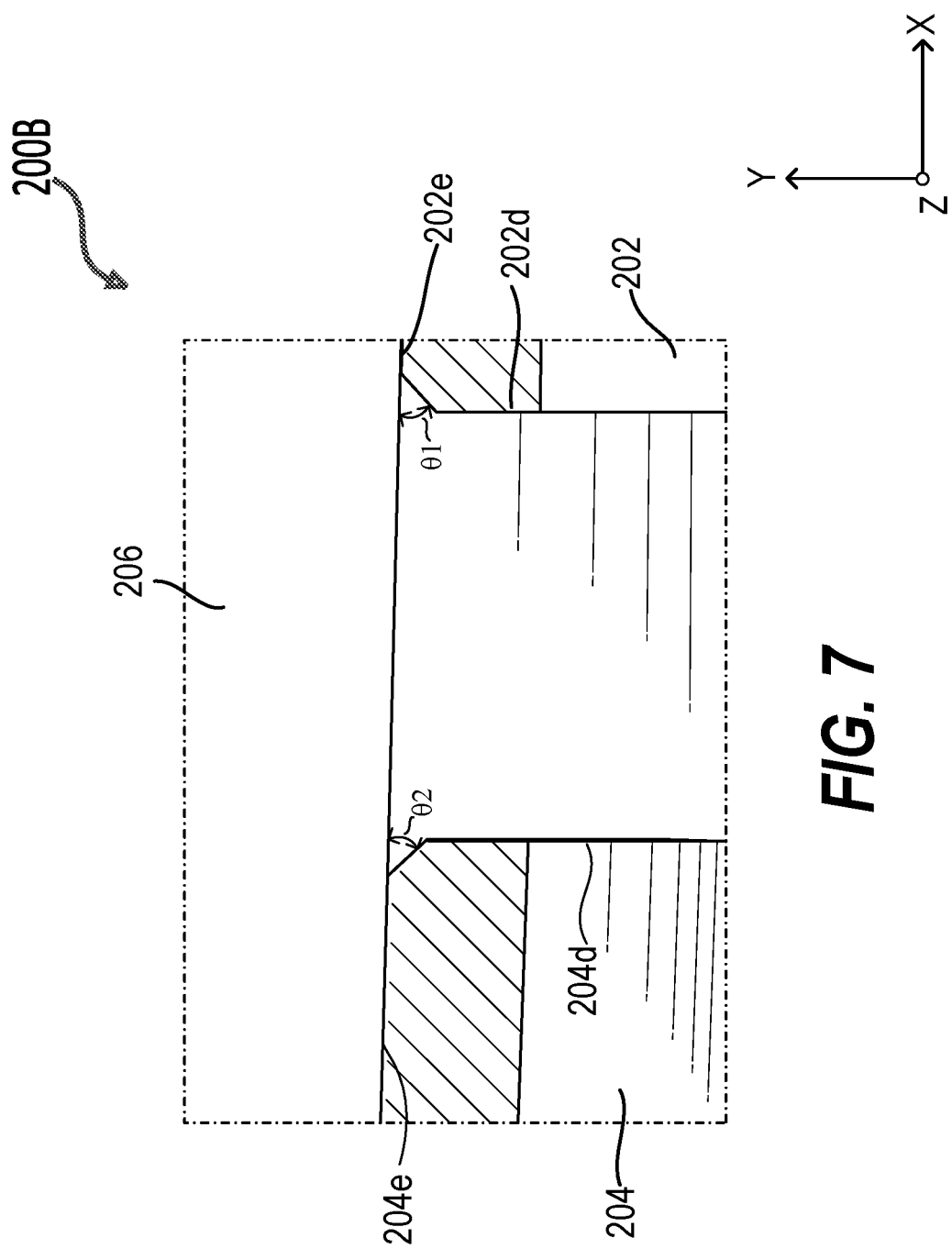
FIG. 7 shows an enlarged view of an example chamfered edge of a pipe in accordance with some aspects.
Figure 8:
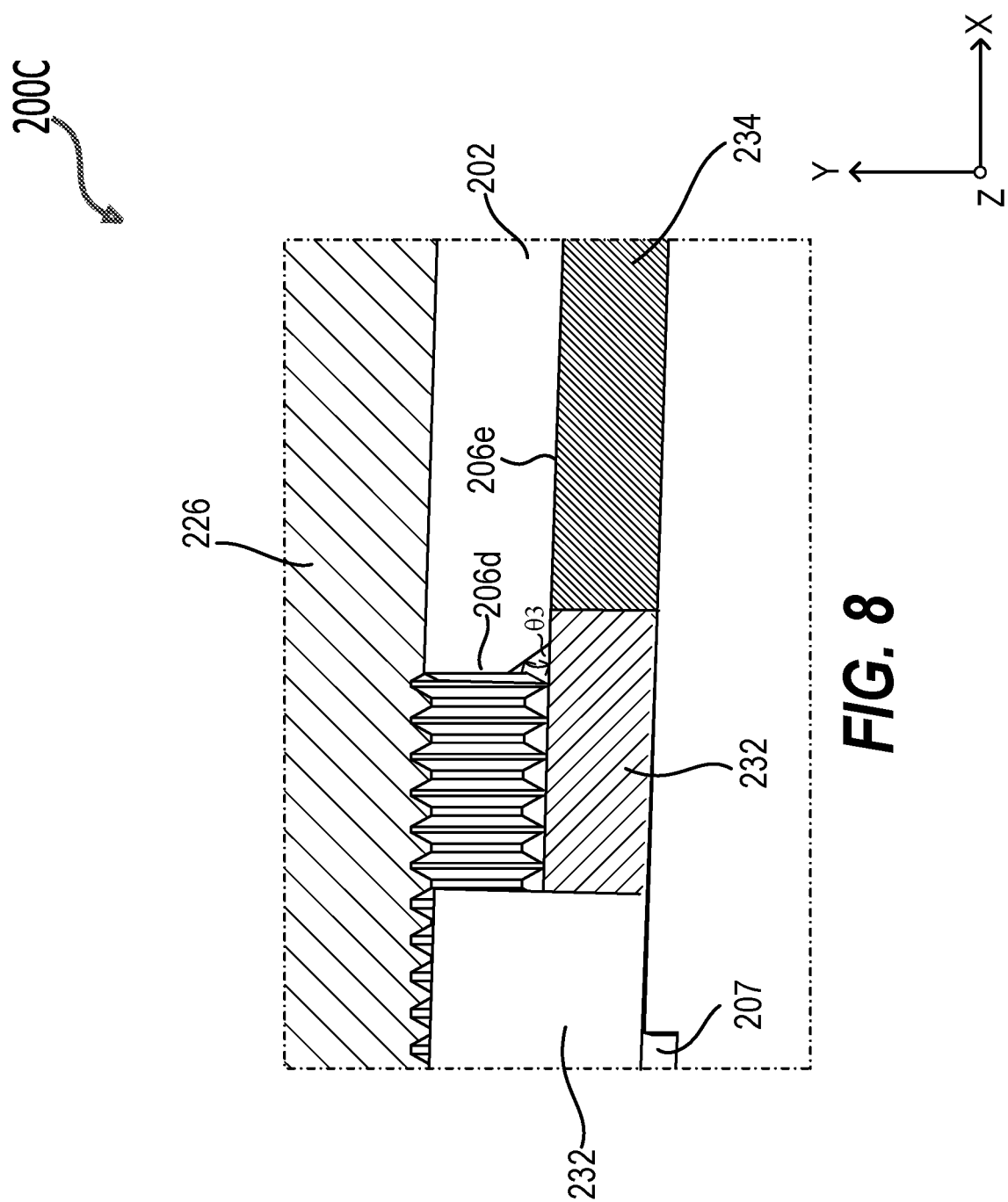
FIG. 8 shows an enlarged view of an example chamfered edge of a packing shell in accordance with some aspects.

Still referring to FIG. 3A, the first end 202a of the first pipe 202 may have a chamfered edge θ1 between a front surface 202d perpendicular to the first direction (e.g., Y direction) and an external surface 202e along the first direction (e.g., X direction). An expanded view of the chamfered edge θ1 of the first end 202a of the first pipe 202 may be shown in FIG. 7. As shown in FIG. 7, the chamfered edge θ1 of the first end 202a of the first pipe 202 may have an angle between 30 degrees and 60 degrees with respect to the first direction (e.g., X direction). Similarly, the first end 204a of the second pipe 204 may have a chamfered edge θ2 between a front surface 204d perpendicular to the first direction (e.g., Y direction) and an external surface 204e along the first direction (e.g., X direction). In an aspect, the packing shell 206 may also have a chamfered edge θ3 that may be arranged between a front surface 206d perpendicular to the first direction (e.g., Y direction) and an external surface 206e along the first direction (e.g., X direction). An expanded view of the chamfered edge θ3 of the packing shell 206 is shown in FIG. 8. As shown in FIG. 8, in one aspect, the chamfered edge θ3 of the packing shell 206 may be opposed to the second compression flange 224 and may have an angle between 30 degrees and 60 degrees with respect to the first direction. The chamfered edges of the first pipe 202, the second pipe 204, and the packing shell 206 may be insertion assistants. For example, the chamfered edges may help the insertion of the first pipe 202, the second pipe 204, the first sealing element 208, and the second sealing element 234 into the packing shell 206.

In an aspect, a gasket (not shown) may be positioned between the first end 202a of the first pipe 202 and the first end 204a of the second pipe 204 and configured to seal a gap between the first end 202a of the first pipe 202 and the first end 204a of the second pipe 204. In an aspect, the gasket may be made of flexible carbon or flexible graphite and may have a thickness between 1 mm to 20 mm.

Figure 3B:
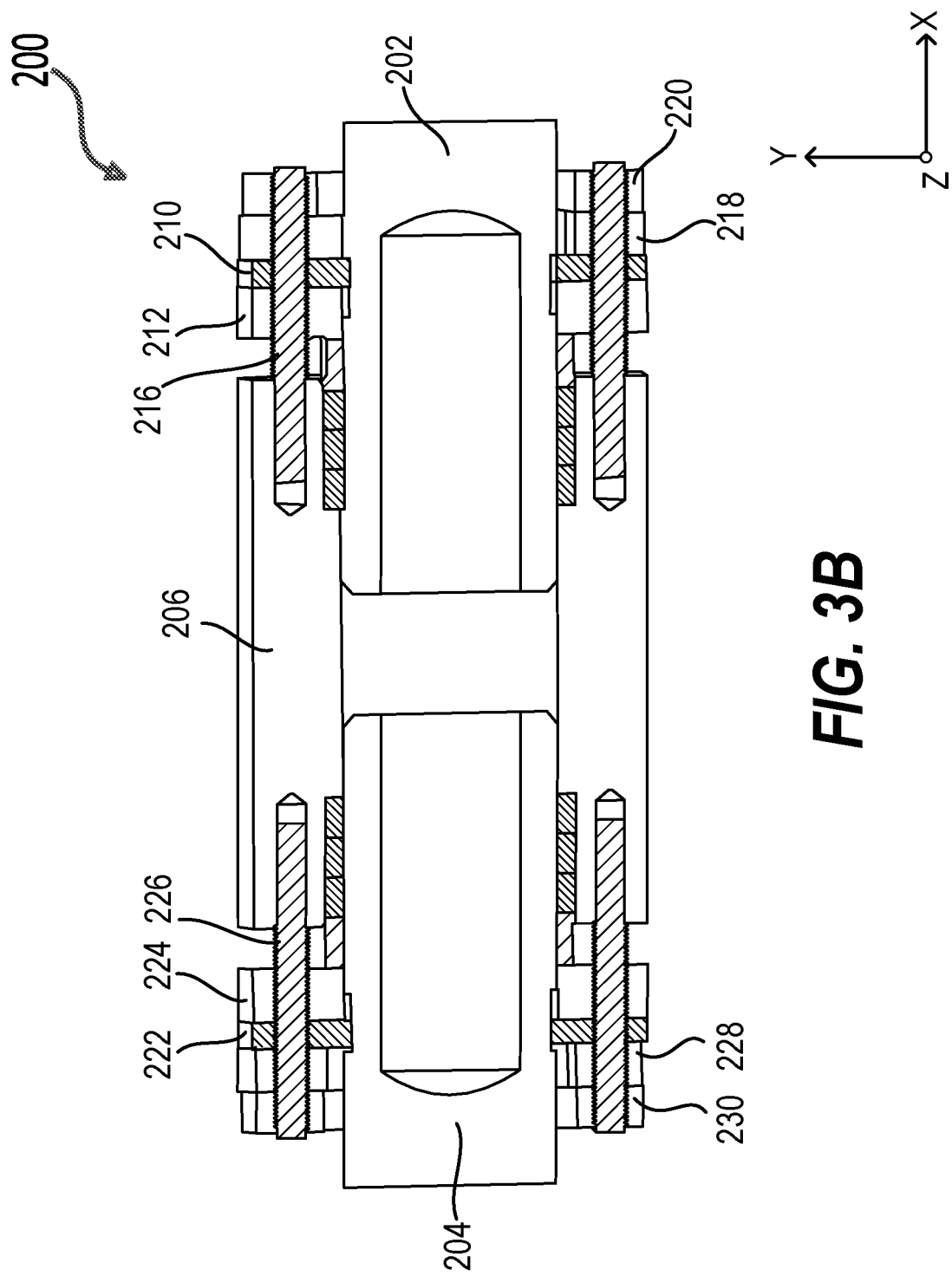
FIG. 3B shows a second cross-sectional view of the example joint structure in accordance with some aspects.

FIG. 3B shows another example cross-sectional view of the joint 200. As shown in FIG. 3B, at the side of the first pipe 202, the first set of nuts 218 may be disposed adjacent to the first split flange 210. The second set of nuts 220 may be arranged adjacent to the first set of nuts 218. The bolts 216 may extend through the first set of nuts 218, the second set of nuts 220, the first split flange 210, the first compression flange 212, and further into the packing shell 206. Similarly, at the side of the second pipe 204, the first set of nuts 228 may be disposed adjacent to the second split flange 222. The second set of nuts 230 may be arranged adjacent to the first set of nuts 228. The bolts 226 may extend through the first set of nuts 228, the second set of nuts 230, the second split flange 222, the second compression flange 224, and further into the packing shell 206. By introducing two sets of nuts on each side of the packing shell 206, the bolts may be fastened and secured (e.g., as a jam nut). It is also possible to reactively bond the nuts into place so that they cannot loosen during thermal cycling.

FIG. 4 shows an example cross-sectional view of the packing shell 206. As shown in FIG. 4, the packing shell 206 may have a first inner diameter 206h and a second inner diameter 206i, and an outer diameter 206f. The recess regions 206b and 206c may be defined by a diameter difference between the first inner diameter 206h and the second inner diameter 206i. In an aspect, the packing shell 206 may have a length L in the first direction (e.g., X direction) in a range between 2 inches to 50 inches. The packing shell 206 may have holes 206g into which the bolts 216 and 226 may be screwed. The holes 206g may have a length in a range between 1 inch to 20 inches, for example.

Figure 5A:
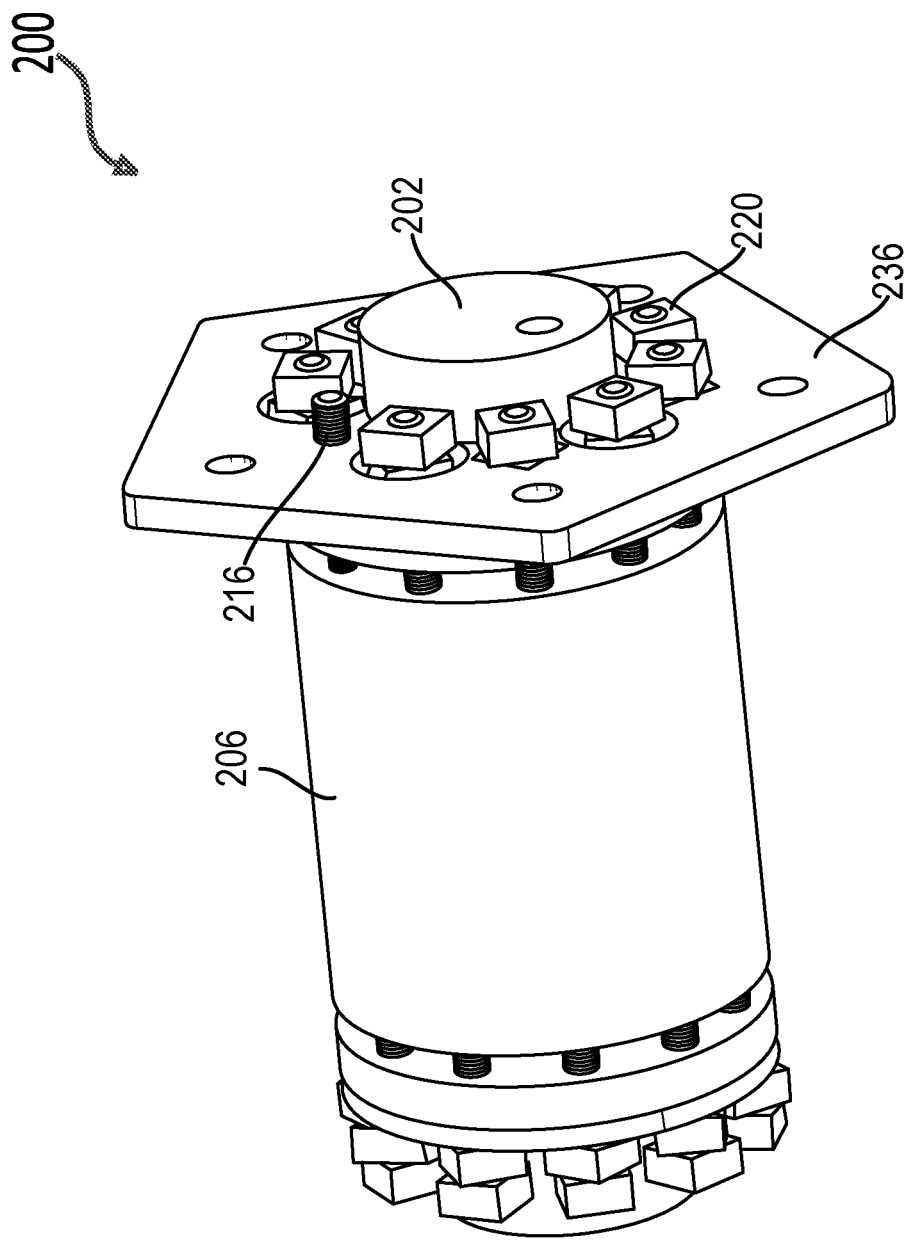
FIG. 5A shows an illustration of an example clamping plate in accordance with some aspects.
Figure 5B:
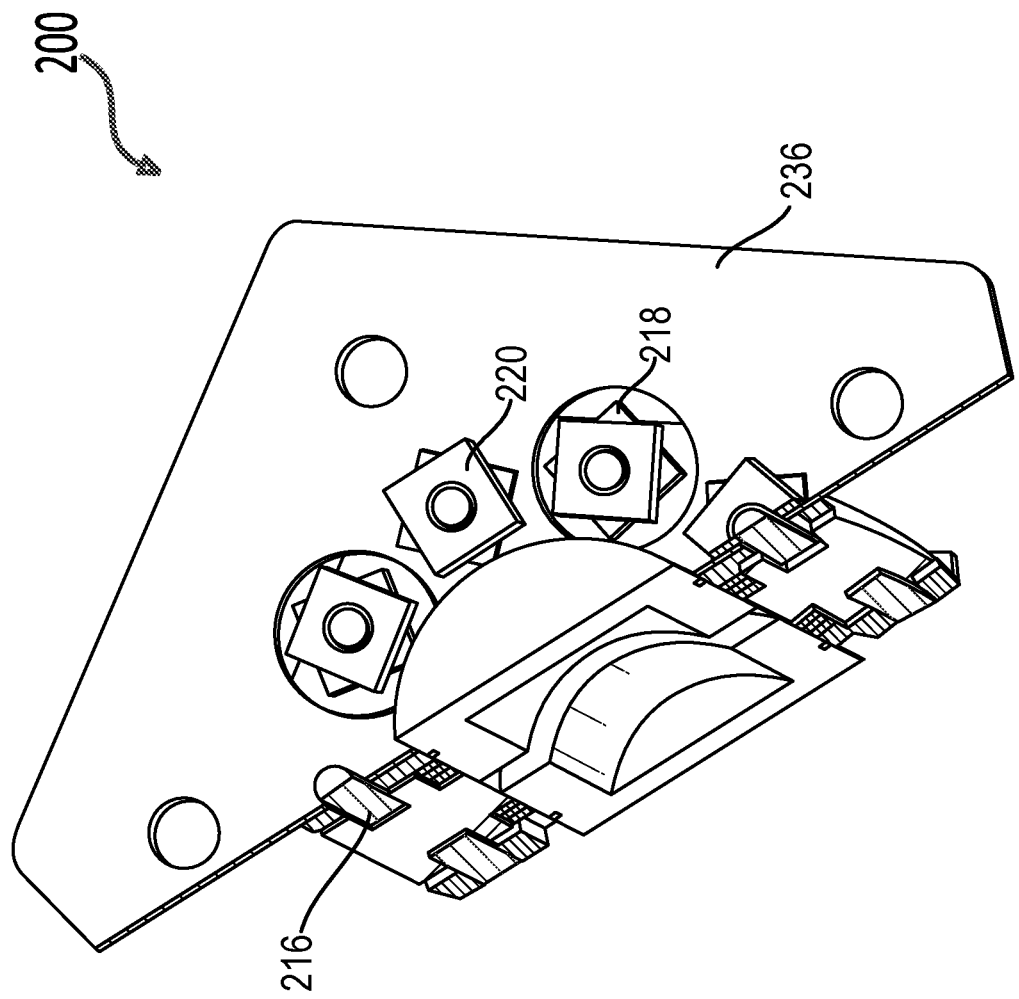
FIG. 5B shows a cross-sectional view of the example clamping plate in accordance with some aspects.

FIG. 5A shows an alternative front view of the joint 200 and FIG. 5B shows an alternative cross-sectional view of the joint 200. As shown in FIGS. 5A and 5B, the joint 200 may include a clamping plate 236 that may be positioned between the first split flange 210 and the first set of nuts 218 and configured to exert compression to the first sealing element 208. In one aspect, the clamping plate 236 may function as an installation tool. Thus, once the compression force has been imposed on the first sealing element 208, the first clamping plate 236 may be removed. In an aspect, by using the clamping plate 236, the bolts 216 may not be used for the initial compression of the seal material (or sealing element), but may be used to maintain the compression which may be exerted by the clamping plate 236. Thus, the sealing element may be squeezed by the clamping plate 236 at first, and the nuts (e.g., 218 and 220) may then be fastened to maintain the deformation of the sealing element. Accordingly, the amount of force used to create the seal may not have to be the amount of force applied to maintain the seal. The compression applied through the clamping plate 236 may be in a range between megapascal to gigapascal, such as 30 megapascal. In an aspect, the clamping plate 236 may be made of a material with high strength, such as metal.

In an aspect, the bolts 216, the first compression flange 212, and the first split flange 210 may have a similar thermal expansion coefficient. Similarly, the bolts 226, the second compression flange 224, and the second split flange 222 may have a similar thermal expansion coefficient.

In an aspect first pipe 202, the second pipe 204, and the packing shell 206 may have similar thermal expansion coefficients or could be designed such that the choice of materials and dimensions lead to a similar overall thermal expansion that tightens the seal, keeps the sealing pressure close to constant, or decreases it.

In an aspect, the first pipe 202, the second pipe 204, and the packing shell 206 may be made of a first graphite material. The first compression ring 214, the first compression flange 212, and the first split flange 210 may be made of a second graphite material that may have a higher strength than the first graphite material, for example. In an aspect, the first set of nuts 218, the second set of nuts 220, and the bolts 216 may be made of a third graphite material that may have a higher strength than the second graphite material, such as a carbon fiber reinforced composite.

In an aspect, a flat interface between two components of the joint 200 may be applied to reduce to stress concentration. For example, an interface between the packing shell 206 and the compression ring 214 may have a flat surface along the first direction (e.g., Y direction). In another example, an interface between the first pipe 202 and the packing shell 206 may be flat such that both the outer surface 202c of the first pipe 202 and the inner surface 206a of the packing shell 206 may be flat. Thus, the piping system may be rest on a flat surface of the packing shell 206. In yet another example, an interface between the compression flange (e.g., 212) and the split flange (e.g., 210) may be flat.

In an aspect, the liquid, such as the liquid metal (e.g., Sn), flowing in the first pipe 202 and the second pipe 204 may be doped, alloyed, or mixed with another element, for example. For example, as previously noted, the liquid metal may be doped with silicon or another element. The liquid doped with additional elements may react with the piping (e.g., 202 and 204) or ceiling materials (e.g., 206) to form a leak barrier. For example, when the liquid metal is doped with silicon, silicon may react with carbon to form silicon carbide. The silicon carbide may function as a leakage prevention layer to block the penetration of the liquid (e.g., Sn) that may be self-healing during operation, and may also reduce the rate of any carbon dissolution into the liquid.

In an aspect, a first chemical bonding layer (not shown) may be formed and filled in the first gap 201 and the second gap 203. A second chemical bonding layer (not shown) may be formed and positioned between the bolts 216 and the packing shell 206. A third chemical bonding layer may be formed between the first set of nuts 218 and the second set of nuts 220, for example. A fourth chemical bonding layer may be formed between the split flange 210 and the first set of nuts 218. In an aspect, to form the chemical bonding layers, suitable adhesive materials, such as a tar, pitch, or phenolic resin derived adhesive, may be applied. For example, the adhesive that may contain tar, pitch or phenolic resin may be baked or cured in place and become carbon (interchangeably referred to herein as monolithic carbon). Thus, the joint 200 may be formed by relying on a reaction bonding agent or some form of chemical bonding between components to make a seal. Accordingly, the joint 200 may not dynamically slide or rotate, but the joint 200 may be used in combination with the dynamically sealed joints to centralize the dynamic motion to convenient locations in a system. Thus, not all the joints in the thermal battery system 100 need to move dynamically. It could be advantageous to have only a limited number of dynamic joints in convenient or strategic locations that account for all the thermal growth/shrinkage, while the rest of the joints may be comprised of static, non-dynamically sealed joints.

Figure 9:
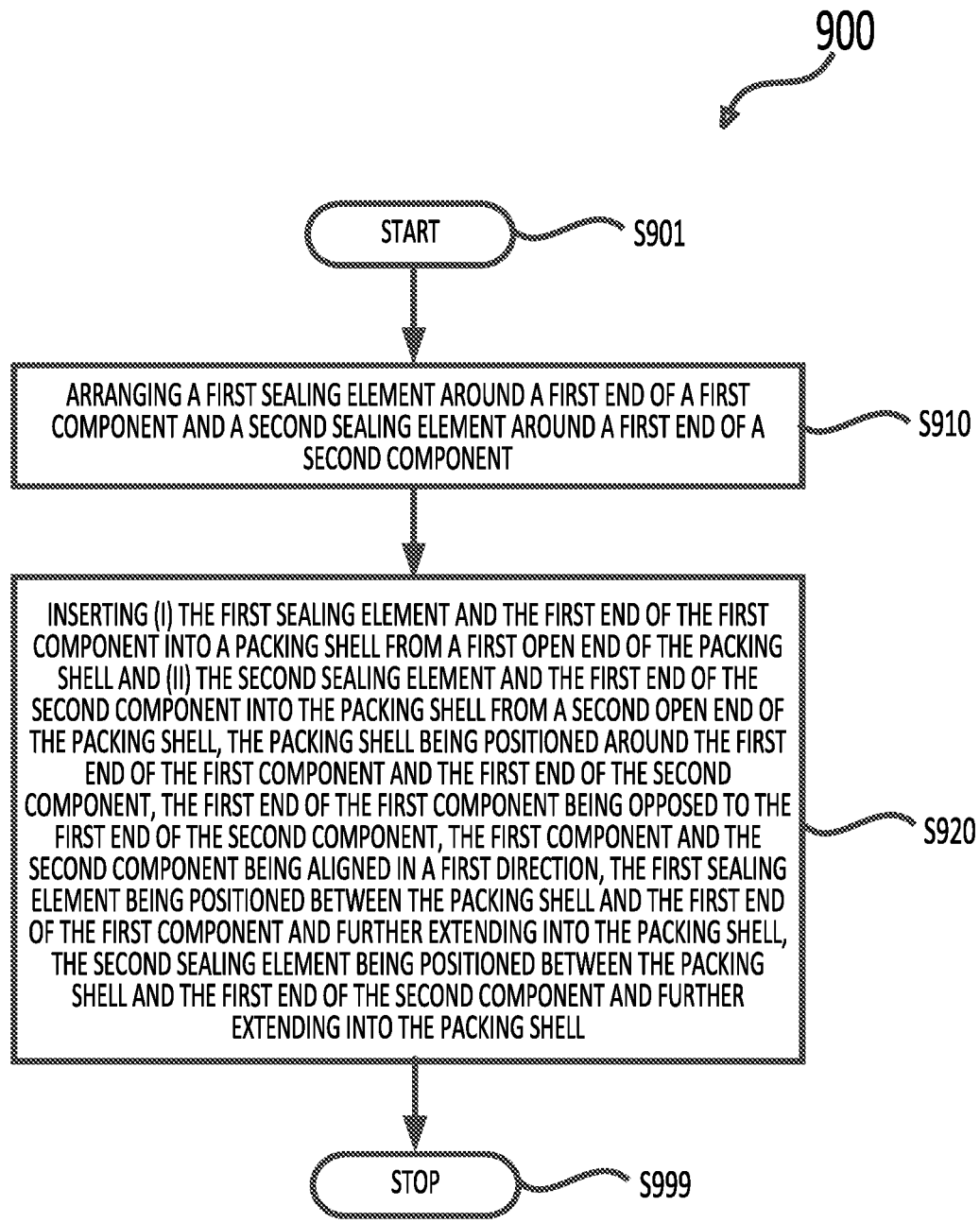
FIG. 9 shows a flow chart outlining an example process to form a joint structure according to some aspects of the disclosure.

FIG. 9 shows a flow chart outlining an example process 900 to form a joint structure.

As shown in FIG. 9, the process 900 starts from S901 and proceeds to S910.

At S910, a first sealing element may be arranged around a first end of a first component and a second sealing element may be arranged around a first end of a second component. An example aspect of step S910 is shown in FIG. 2A.

At S920, the first sealing element and the first end of the first component may be inserted into a packing shell from a first open end of the packing shell. The second sealing element and the first end of the second component may be inserted into the packing shell from a second open end of the packing shell. The packing shell may be positioned around the first end of the first component and the first end of the second component. The first end of the first component may be opposed to the first end of the second component. The first component and the second component may be aligned in a first direction, for example. The first sealing element may be positioned between the packing shell and the first end of the first component and further extends into the packing shell. In an aspect, the second sealing element may be positioned between the packing shell and the first end of the second component and further extends into the packing shell. An example aspect of step S920 is shown in FIGS. 2A and 3A.

In an example, a first compression ring may be arranged around the first end of the first component. A first end of the first compression ring may be: (i) adjacent to the first sealing element; and (ii) positioned between the first end of the first component and the packing shell. A second compression ring may be arranged around the first end of the second component, where a first end of the second compression ring may be: (i) adjacent to the second sealing element; and (ii) positioned between the first end of the second component and the packing shell.

In an example, a first compression flange may be arranged adjacent to a second end of the first compression ring and around the first end of the first component. A second compression flange may be disposed adjacent to a second end of the second compression ring and around the first end of the second component.

In an example, a first split flange may be arranged adjacent to the first compression flange and around the first end of the first component. The first split flange may include a first portion and a second portion and further may be arranged in a first recessed region of the first component, for example. In an aspect, a second split flange may be arranged adjacent to the second compression flange and around the first end of the second component, where the second split flange may include a third portion and a fourth portion and further may be arranged in a second recessed region of the second component.

Then, the process proceeds to S999 and terminates.

The process 900 may be suitably adapted. Step(s) in the process 900 may be modified and/or omitted. Additional step(s) may be added. Any suitable order of implementation may be used.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While several example aspects have been described herein, there are alterations, permutations, and various substitute equivalents, which fall within the scope of aspects of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A joint structure comprising:
a first component and a second component aligned in a first direction, a first end of the first component being opposed to a first end of the second component;
a packing shell positioned around the first end of the first component and the first end of the second component such that the first component is inserted into the packing shell from the first end and the second component is inserted into the packing shell from the first end, wherein the first component, the second component, and the packing shell are made of a first graphite material;
a first sealing element positioned between the packing shell and the first end of the first component and further extending into the packing shell;
a second sealing element positioned between the packing shell and the first end of the second component and further extending into the packing shell;
a first compression ring positioned around the first end of the first component, a first end of the first compression ring being (i) adjacent to the first sealing element and (ii) positioned between the first end of the first component and the packing shell;
a second compression ring positioned around the first end of the second component, a first end of the second compression ring being (i) adjacent to the second sealing element and (ii) positioned between the first end of the second component and the packing shell;
a first compression flange positioned adjacent to a second end of the first compression ring and around the first end of the first component;

a second compression flange positioned adjacent to a second end of the second compression ring and around the first end of the second component;
a first split flange positioned adjacent to the first compression flange and around the first end of the first component, the first split flange comprising a first portion and a second portion and further being arranged in a first recessed region of the first component; and
a second split flange positioned adjacent to the second compression flange and around the first end of the second component, the second split flange comprising a third portion and a fourth portion and further being arranged in a second recessed region of the second component.

2. The joint structure of claim 1, wherein:
a first gap is positioned between an outer surface of the first end of the first component and an inner surface of the packing shell, the first gap being in a range between 100 micrometers and 2000 micrometers, and
a second gap is positioned between an outer surface of the first end of the second component and the inner surface of the packing shell, the second gap being in the range between 100 micrometers and 2000 micrometers.

3. The joint structure of claim 1, wherein:
the packing shell comprises
(i) a first recess region into which the first sealing element extends, the first recess region surrounding the first end of the first component, and
(ii) a second recess region into which the second sealing element extends, the second recess region surrounding the first end of the second component.

4. The joint structure of claim 1, further comprising:
a first nut disposed adjacent to the first split flange;
a first bolt extending through the first nut, the first split flange, the first compression flange, and further into the packing shell;
a second nut disposed adjacent to the second split flange; and
a second bolt extending through the second nut, the second split flange, the second compression flange, and further into the packing shell.

5. The joint structure of claim 4, further comprising:
a first clamping plate positioned between the first split flange and the first nut and configured to exert compression to the first sealing element.

6. The joint structure of claim 4, wherein the first bolt, the first compression flange, and the first split flange have a similar thermal expansion coefficient.

7. The joint structure of claim 4, wherein:
the first compression ring, the first compression flange, and the first split flange are made of a second graphite material that has a strength higher than a strength of the first graphite material.

8. The joint structure of claim 7, wherein the first nut and the first bolt are made of a third graphite material that has a strength higher than the strength of the second graphite material.

9. The joint structure of claim 1, wherein the first sealing element is made of a deformable material and comprises one of (i) a plurality of packing ropes and (ii) a ferrule.

10. The joint structure of claim 1, wherein the first component, the second component, and the packing shell have a similar thermal expansion coefficient.

11. The joint structure of claim 1, further comprising:
a liquid flowing in the first component and the second component, the liquid being doped with silicon.

12. A joint structure comprising:
a first component and a second component aligned in a first direction, a first end of the first component being opposed to a first end of the second component, wherein the first end of the first component has a chamfered edge between a front surface perpendicular the first direction and an external surface along the first direction, the chamfered edge of the first end of the first component having an angle between 30 degrees and 60 degrees with respect to the first direction;
a packing shell positioned around the first end of the first component and the first end of the second component such that the first component is inserted into the packing shell from the first end and the second component is inserted into the packing shell from the first end, wherein:
the first component, the second component, and the packing shell are made of a first graphite material, and
the packing shell has a chamfered edge that is arranged between a front surface perpendicular the first direction and an external surface along the first direction, the chamfered edge of the packing shell being opposed to a first compression flange and having the angle between 30 degrees and 60 degrees with respect to the first direction;
a first sealing element positioned between the packing shell and the first end of the first component and further extending into the packing shell; and
a second sealing element positioned between the packing shell and the first end of the second component and further extending into the packing shell.

13. The joint structure of claim 12, wherein:
a first gap is positioned between an outer surface of the first end of the first component and an inner surface of the packing shell, the first gap being in a range between 100 micrometers and 2000 micrometers, and
a second gap is positioned between an outer surface of the first end of the second component and the inner surface of the packing shell, the second gap being in the range between 100 micrometers and 2000 micrometers.

14. The joint structure of claim 12, wherein the packing shell comprises:
(i) a first recess region into which the first sealing element extends, the first recess region surrounding the first end of the first component, and
(ii) a second recess region into which the second sealing element extends, the second recess region surrounding the first end of the second component.

15. The joint structure of claim 12, further comprising:
a first compression ring positioned around the first end of the first component, a first end of the first compression ring being (i) adjacent to the first sealing element and (ii) positioned between the first end of the first component and the packing shell, and
a second compression ring positioned around the first end of the second component, a first end of the second compression ring being (i) adjacent to the second sealing element and (ii) positioned between the first end of the second component and the packing shell.

16. The joint structure of claim 15, further comprising:
a first compression flange positioned adjacent to a second end of the first compression ring and around the first end of the first component, and
a second compression flange positioned adjacent to a second end of the second compression ring and around the first end of the second component.

17. The joint structure of claim 12, further comprising:
a first split flange positioned adjacent to the first compression flange and around the first end of the first component, the first split flange comprising a first portion and a second portion and further being arranged in a first recessed region of the first component; and
a second split flange positioned adjacent to the second compression flange and around the first end of the second component, the second split flange comprising a third portion and a fourth portion and further being arranged in a second recessed region of the second component.

18. A method of forming a joint structure, the method comprising:
arranging a first sealing element around a first end of a first component and a second sealing element around a first end of a second component;
inserting (i) the first sealing element and the first end of the first component into a packing shell from a first open end of the packing shell and (ii) the second sealing element and the first end of the second component into the packing shell from a second open end of the packing shell,
the first component, the second component, and the packing shell being made of a first graphite material,
the packing shell being positioned around the first end of the first component and the first end of the second component, the first end of the first component being opposed to the first end of the second component,
the first component and the second component being aligned in a first direction, the first sealing element being positioned between the packing shell and the first end of the first component and further extending into the packing shell, and
the second sealing element being positioned between the packing shell and the first end of the second component and further extending into the packing shell;
arranging a first compression ring around the first end of the first component, a first end of the first compression ring being (i) adjacent to the first sealing element and (ii) positioned between the first end of the first component and the packing shell;
arranging a second compression ring around the first end of the second component, a first end of the second compression ring being (i) adjacent to the second sealing element and (ii) positioned between the first end of the second component and the packing shell;
arranging a first compression flange adjacent to a second end of the first compression ring and around the first end of the first component; and
arranging a second compression flange adjacent to a second end of the second compression ring and around the first end of the second component,
arranging a first split flange adjacent to the first compression flange and around the first end of the first component, the first split flange including a first portion and a second portion and further being arranged in a first recessed region of the first component; and
arranging a second split flange adjacent to the second compression flange and around the first end of the second component, the second split flange including a third portion and a fourth portion and further being arranged in a second recessed region of the second component.

19. The method of claim 18, wherein the first compression ring, the first compression flange, and the first split flange are made of a second graphite material that has a strength higher than a strength of the first graphite material.

* * * * *